(12) United States Patent
Tylicki et al.

(10) Patent No.: US 9,942,960 B2
(45) Date of Patent: Apr. 10, 2018

(54) AMBIENT FLAME STYLE FLICKER LIGHTING SYSTEM AND METHODS

(71) Applicant: HeathCo LLC, Bowling Green, KY (US)

(72) Inventors: Scott Blaise Tylicki, Bowling Green, KY (US); Brian James Skelton, Lake Zurich, IL (US); Michael C. Garrett, Wilmette, IL (US); Michael C. McKee, Arlington Heights, IL (US); Jackson Wilson, Evanston, IL (US)

(73) Assignee: HealthCo LLC, Bowling Green, KY (US)

( * ) Notice: Subject to any disclaimer, the term of this patent is extended or adjusted under 35 U.S.C. 154(b) by 0 days.

(21) Appl. No.: 15/649,453

(22) Filed: Jul. 13, 2017

(65) Prior Publication Data

US 2018/0020524 A1    Jan. 18, 2018

Related U.S. Application Data

(60) Provisional application No. 62/361,795, filed on Jul. 13, 2016.

(51) Int. Cl.
*H05B 33/08* (2006.01)
*H05B 37/02* (2006.01)
(Continued)

(52) U.S. Cl.
CPC .......... *H05B 33/0872* (2013.01); *F21S 10/04* (2013.01); *G02B 6/0045* (2013.01);
(Continued)

(58) Field of Classification Search
CPC ................ H05B 33/08; H05B 33/0842; H05B 33/0845; H05B 33/0872; H05B 37/02; H05B 37/0218; H05B 37/0227; F21S 10/00; F21S 10/005; F21S 10/04; G02B 6/00; G02B 6/0045; G02B 6/0096
See application file for complete search history.

(56) References Cited

U.S. PATENT DOCUMENTS 5,598,066 A    1/1997   Wiesemann et al.
6,719,443 B2   4/2004   Gutstein et al.
(Continued)

OTHER PUBLICATIONS

"Exterior Security Lighting PY109.06" Student Guide.

*Primary Examiner* — Thai Pham
(74) *Attorney, Agent, or Firm* — Middleton Reutlinger

(57) ABSTRACT

The described embodiments relate to systems, methods, and apparatuses for controlling a lighting unit to provide multiple different static and dynamic illumination patterns. The illumination patterns can be provided in response to changes in environmental conditions detected by sensors of the lighting unit. For instance, the lighting unit can provide a flame-like illumination pattern when the sensor is detecting a first threshold amount of motion, and a static illumination pattern when the sensor is detecting a second threshold amount of motion. The flame-like illumination pattern can be expressed using multiple light guides that extend from the lighting unit and receive different colors of light that imitate the motion of a flame. The light guides can be, for example, cylindrical or pipe-shaped, and etched with different patterns to absorb and reflect incident light.

20 Claims, 6 Drawing Sheets

(51) Int. Cl.
  *F21S 10/00* (2006.01)
  *G02B 6/00* (2006.01)
  *F21V 8/00* (2006.01)
  *F21S 10/04* (2006.01)
  *F21Y 115/10* (2016.01)
  *F21W 121/00* (2006.01)

(52) U.S. Cl.
  CPC ....... *G02B 6/0096* (2013.01); *H05B 37/0218* (2013.01); *F21W 2121/00* (2013.01); *F21Y 2115/10* (2016.08)

(56) References Cited

U.S. PATENT DOCUMENTS

| | | |
|---|---|---|
| 6,909,239 B2 | 6/2005 | Gauna |
| 7,804,252 B2 | 9/2010 | Chen |
| 2005/0259446 A1 | 11/2005 | Smith |
| 2008/0198009 A1 | 8/2008 | Hoeben et al. |
| 2011/0279034 A1 | 11/2011 | Lucas et al. |
| 2015/0028750 A1 | 1/2015 | Chen |
| 2015/0110355 A1* | 4/2015 | Dill .................. A63J 1/02 382/103 |
| 2016/0278186 A1* | 9/2016 | Van De Sluis .... H05B 33/0863 |
| 2017/0181245 A1* | 6/2017 | Fadell ............... H05B 33/0872 |

* cited by examiner

AMBIENT FLAME STYLE FLICKER LIGHTING SYSTEM AND METHODS

TECHNICAL FIELD

The present invention is directed generally to a lighting system responsive to motion and other environmental conditions. More specifically, the invention is a security lighting system that includes ambient or decorative style lighting using a plurality of lighting arrays that enable a low flame or flicker illumination in combination with a high illumination level that may be responsive to motion or other sensors.

BACKGROUND

Outdoor security and ambient lighting is commonplace in use for both residential and commercial environments. Many of these lighting systems are electrically connected to a power source and are powered to illuminate large areas after detection of movement utilizing proximity and/or motion sensors. Security lighting systems often have high wattage illumination lamps and function to provide low level lighting for a period of time after dusk and high level lighting upon detection of movement by the motion/proximity sensors.

Security lighting systems can be limited in that they typically employ high wattage lamps that can be distracting to users. Some prior art lighting systems address these problems by employing replacement bulbs, for example candelabra style lamps or E26 style screw-in lamps. These solutions, while functional, are not typically realistic looking and often don't provide suitable illumination for a given area or application.

SUMMARY

The present disclosure is directed to a security and ambient lighting unit having a plurality of lights that may be separately controlled and illuminated. More particularly, various inventive methods and apparatus disclosed herein relate to providing a security lighting apparatus that has separately controlled LED arrays that can be selectively illuminated and responsive to stimuli sensed by at least one detection sensor. The system and methods of the invention will provide a user with a low illumination flicker style lighting arrangement and a separate higher illumination level flicker-style lighting arrangement each selectively responsive to sensed motion, ambient light, sound, video, or other sensors that provide an output indicative of a reason to illuminate a given area.

Furthermore, the disclosure is directed towards a dual-bright motion sensor activated outdoor security or ambient lighting unit, which operates at a decorative low light level. When motion or another variable is sensed, the lighting unit switches to a higher output illumination level. The decorative low light level is designed to drive a plurality of LEDs in a first array of LEDs at a level, which provides the simulated appearance of a flickering gas flame. In some implementations, a plurality of lighting elements or LEDs may be utilized having a plurality of colors, wherein each of the colors of LEDs are modulated in intensity by a control circuit or other computing device.

In some aspects, a computing device of a lighting unit can include a microprocessor that executes a stored control program. The program may include stored amplitude waveforms for the generation of flame simulation by selective powering of LEDs. Such a program can include random processes to keep the flame constantly changing, thus simulating flickering. The computing devices can also modulate the current supplied to the individual lighting elements such that each are selectable from a set of discrete values. In one exemplary implementation, a memory associated with the processor and concomitant control circuit or unit may have tables of amplitude modulated time waveforms or alternatively frequency (pulse-width modulated) modulated waveforms which are stored in the memory. These modulation values can include real time control data streams for the individual lighting elements or LED arrays utilized in the system.

Thus, by using a table of waveforms or other control characteristics of the LEDs, many different flame modes can be simulated while employing the same LED banks. Various flickering flame effects can thus be implemented such as low flicker, high flicker caused by wind or other disturbance or combinations of modulations, which can be inserted into the flame simulation at random intervals. In some implementations, a predetermined time after a detected motion event or other sensed parameter, the simulated flickering LED flame may return to a steady state operation which may be, in some implementations, a low light level flame flickering emulation. The decorative low light level simulated flame thus results in a simulated flame which slowly changes in a random series of patterns.

In further aspects of the invention the security lighting system can also provide a second higher output illumination level when motion is detected. To detect motion, the lighting system may include various circuits to detect and/or determine motion or activity within a field of view. These can include, in various implementations, a passive infrared (PIR) sensor, microwave, dual technology motion sensors, area reflective type sensors, ultrasonic sensors, and vibration sensors. Upon detection of movement, the control system may modify the light output by energizing a second array of LEDs which may be a different color temperature than the first array of LEDs and are designed to be driven at a higher frequency for significantly increased illumination output and at a differing color temperature. In some implementations, upon detection of motion, the light output can be increased from a first decorative low light level and first color temperature to a second high light level and at a second color temperature.

Alternatively, in some implementations, the security lighting system of the various described embodiments may provide a plurality of differing lighting schemes by varying the output signals provided to the plurality of LED arrays. In this aspect, the LED arrays can be selectively driven by the computing device to produce, for example, a uniform or patterned movement of LEDs to produce various light patterns. Some non-limiting light patterns that may be produced by the system of the invention include wave motion, circular motion, or even alpha-numerical patterns to represent house address numbers or any other programmed message.

In some implementations, a method implemented by one or more processors is set forth as including a step of causing a lighting unit to provide a first illumination pattern. The first illumination pattern can include light emitted by a first light guide that is illuminated by a first array of light emitting diodes (LEDs) of the lighting unit. The method can further include determining that sensor data from a sensor of the lighting unit has reached a threshold value. The sensor can be responsive to environmental conditions of the lighting unit. The method can also include causing the lighting unit to provide a second illumination pattern. The second illumination pattern can include light emitted by a second light guide that is illuminated by a second array of LEDs of the lighting unit. The first light guide and the second light guide can be at least semi-transparent and extend, in parallel, away from the first array of LEDs and the second array of LEDs. The first illumination pattern can be a dynamic illumination pattern and the second illumination pattern can be a static illumination pattern. The sensor data can correspond to motion data from the sensor, and the first illumination pattern can include a color of light that is excluded from the second illumination pattern. The second light guide can include multiple light guides that surround the first light guide. The first light guide and the second light guide can include different etched patterns. The first light guide can include a first etched pattern that is located on a different area of the first light guide relative to a location of a second etched pattern included at the second light guide. The first etched pattern can be located closer to the first array of LEDs and the second array of LEDs than the second etched pattern.

In other implementations, a lighting unit is set forth as including a computing device, a sensor that is connected to the computing device and responsive to an environmental condition of the sensor, and a first array of LEDs and a second array of LEDs, each controllable by the computing device. The lighting unit can also include a first light guide and a second light guide configured to distribute light emitted by the first array of LEDs and the second array of LEDs. The computing device can be configured to cause the first array of LEDs and the second array of LEDs to output a dynamic illumination pattern in response to a change in the environmental condition of the sensor. The first light guide can emit a different color of light than the second light guide when the dynamic illumination pattern is being output. The lighting unit can also include a substrate on which the first array of LEDs and the second array of LEDs are disposed. The first light guide and the second light guide can extend in a direction that is perpendicular to the substrate. The first light guide and the second light guide can be at least semi-transparent and formed in a cylindrical shape. The first light guide and the second light guide can include etched patterns, and a first etch pattern of the first light guide can be closer to the substrate than a second etch pattern of the second light guide. The sensor can be an ambient light sensor and the lighting unit can also include a motion sensor. Additionally, the computing device can be further configured to cause one of the first array of LEDs and the second array of LEDs to output a static illumination pattern in response to the motion sensor detecting a threshold amount of motion. The first light guide and the second light guide can be of different lengths, and the second light guide can be illuminated more than the first light guide when outputting the dynamic illumination pattern. The first light guide and the second light guide can be disks that surround the first array of LEDs and the second array of LEDs, respectively. The first light guide and the second light guide can be pipe-shaped guides that extend perpendicular from a substrate on which the first array of LEDs and the second array of LEDs are disposed.

In yet other implementations, a non-transitory computer readable medium is set forth as storing instructions that, when executed by one or more processors, cause the one or more processors to perform steps that include operating a first array of LEDs of a lighting unit according to a first dynamic illumination pattern that causes a first light guide of the lighting unit to receive incident light. The steps can also include receiving sensor data from a sensor connected to the lighting unit. The sensor can be configured to be responsive to environmental conditions of the lighting unit. The steps can also include operating, in response to receiving the sensor data, the first array of LEDs and the second array of LEDs according to a second dynamic illumination pattern that causes (i) a second light guide of the lighting unit to receive more incident light than the first light guide and (ii) the first array of LEDs to output a different color of light than the second array of LEDs. The sensor can be an ambient light sensor and the sensor data can be associated with a decrease in ambient light in an environment of the lighting unit. The second dynamic illumination pattern can cause the first array of LEDs to change brightness more dynamically than the first dynamic illumination pattern. The steps can further include receiving additional sensor data corresponding to an increase in detected motion at the lighting unit, and in response to receiving the additional sensor data, operating a third array of LEDs according to a static illumination pattern that causes a third light guide of the lighting unit to be illuminated. The static illumination pattern can further cause the third light guide to receive light that is brighter than the incident light associated with the second dynamic illumination pattern.

For purposes of the instant specification the term "security lighting system" or "lighting system" or even "ambient lighting system" is used herein to refer to an implementation or arrangement of one or more lights or LED arrays that are driven by a power source controlled by a controller or computing device. Additionally, a given lighting unit optionally may be associated with (e.g., include, be coupled to and/or packaged together with) various other components (e.g., control circuitry and sensors) relating to the operation of the light source(s).

Additionally the term "controller" or "computing device" is used interchangeably herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS in the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

In outdoor lighting applications it is often desirable to have a plurality of lighting illumination levels to provide ambient lighting and/or security lighting conditioned upon the ambient light level of the area and a sensed variable such as motion. The lighting unit provided herein includes a dual-bright type illumination that may include a flicker-style ambient light.

In the following detailed description, for purposes of explanation and not limitation, representative embodiments disclosing specific details are set forth in order to provide a thorough understanding of the claimed invention. However, it will be apparent to one having ordinary skill in the art, having had the benefit of the present disclosure, that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described in conjunction with a security light unit having a housing and, having one or more light heads with various illumination sources. However, one or more aspects of the methods and apparatus described herein may be implemented in other units that have alternative configurations. For example, aspects described herein may be implemented in security light units wherein the illumination sources and/or other components are not enclosed in a housing. Also, for example, aspects described herein may be implemented in units wherein power may be provided to one or more of the components of the security light unit through various electrical connections that are not engageable with a standard illumination sources. Implementation of the one or more aspects described herein in alternatively configured environments is contemplated without deviating from the scope or spirit of the claimed invention.

Figure 1:
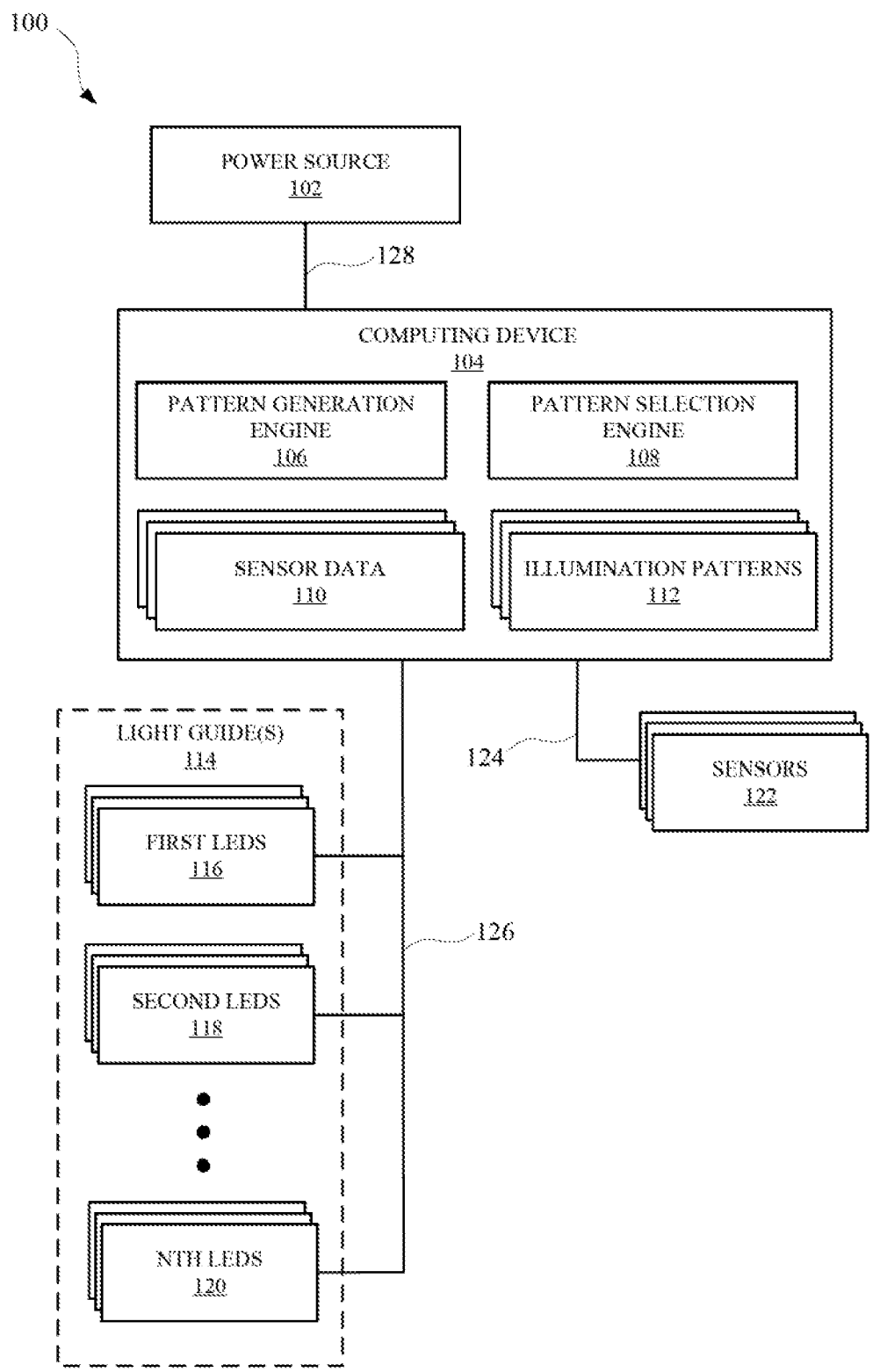
FIG. 1 illustrates an exemplary lighting system in accordance with an embodiment of the invention.

FIG. 1 illustrates a security lighting system 100 including one or more sets of LEDs (e.g., first LEDs 116, second LEDs 118, and Nth LEDs 120) capable of being located at a desired illumination area to provide multi-level illumination thereto. The system 100 can further include a computing device 104 that is connected to one or more sensors 122. For example, the sensors 122 can include an ambient light sensor for detecting a level of ambient light exhibited by an environment of the system 100. The sensors 122 can also include various other sensors such as a motion detection sensor (e.g., a passive infrared (PIR) sensor) far detecting motion in a given zone, an infrared beam break sensor, a sound sensor, an image sensor, or any other sensor that can be connected to a lighting device. In some implementations, the sensors 122 can include a geo-location sensor capable of detecting a location of the system 100. In this way, the computing device 104 use the location data to determine when certain amounts of light will be available in order that sets of LEDs can be controlled according to how much light will be available at a given time. For instance, when the computing device 104 determines that the system 100 is in a location that has low light, the LEDs can be operated to provide a low amount of light to complement the lack of light.

The computing device 104 of the system 100 can include a microprocessor for executing instructions, concomitant data memory, as well as a plurality of inputs 124 and outputs 126 described further herein. The processor executes instructions to operate the plurality of inputs 124 and outputs 126 to provide multi-level illumination to a plurality of LEDs that illuminate ones or more light guides 114. The computing device 104 can further include a user interface that permits a user to configure lighting schedules and low-light detection settings. For example, a user may provide a predetermined daily time after which LEDs 116, 118, and 120 enter a low-light mode where low-level ambient illumination is provided for a set time period.

The system 100 can further include a power source 1102 that is operably connected to a source of electrical power and provides a plurality of power outputs. The power source 102 can provide electrical power to the LEDs, which can be connected to the power source 102 and/or to the computing device 104. The power source 102 can further comprise a connection 128, or a plurality thereof, operably connected to the computing device 104.

In some implementations, the power source 102 provides pulse width modulated signals to the LEDs based upon a desired illumination level communicated to the power source 102 from the computing device 104. For example, the sensor 122 can send a low ambient light level signal to the computing device 104, whereupon the computing device 104 provides an output to the power source 102 to cause at least one set of LEDs to output a flicker-type low light illumination pattern. The power source 102 can then provide a predetermined PWM output to a set of LEDs (e.g., the first LEDs 116) that is representative of a low-illumination level flicker lighting output. It should be noted that system 100 may include a wide variety of user selectable decorative low light level schemes, for example simulated flames that slowly change in a random series of patterns, or even predetermined alphanumeric sequences as desired. The flicker-style flame illumination provided by one or more sets of LEDs can thus provide an aesthetically pleasing low-illumination ambient light.

When system 100 is in a low-light mode, either as sensed by a sensor 122 or by a user-defined predetermined time period, and the sensor 122 senses a motion event, the computing device 104 can initiate a full-light signal output to the power source 102. The power source 102 can then provide a high-illumination PWM signal to, for example, the first LEDs 116 and the second LEDs 118, to provide full-illumination for a predetermined time period after detection of the motion event. In a yet further aspect of the invention, the sensors 122 and/or LEDs can be remotely positioned relative to the computing device 104 to provide illumination responsive to a sensed parameter at a variety of locations.

In some implementations, the system 100 can provide low-light illumination through a custom algorithm that energizes the LEDs selectively according to a desired illumination scheme. In one embodiment low-level illumination may not exceed 250 lumens, while high-level illumination may provide a much greater illumination level. In another embodiment of the invention, upon detection of movement, the computing device 104 can modify the light output by energizing the second LEDs 118. The second LEDs 118 can be a different color temperature than the first LEDs 116 and can be driven at a higher frequency for significantly increased illumination output at the different color temperature. In some implementations, upon detection of motion, the light output can be increased from a first decorative low light level, via the first LEDs 116 and first color temperature, to a second high light level via the second LEDs 118 and a second color temperature.

In some implementations, the system 100 can provide a plurality, of differing lighting schemes by varying an output to the first LEDs 116, the second LEDs 118, and/or the Nth LEDs 120. For instance, the first LEDs 116 and the second LEDs 118 can be selectively driven by the computing device 104 to produce, for example, a uniform or patterned movement of light to produce various light patterns. Some non-limiting light patterns that can be produced by the system 100 can include wave motion, circular motion, or even alpha-numerical patterns to represent house address numbers or any other programmed message.

In some implementations, the computing device 104 can include a pattern selection engine 108 that can select a suitable illumination pattern from multiple different illumination patterns 112 stored by the computing device 104. The pattern selection engine 108 can be responsive to signals generated by one or more of the sensors 122 in response to certain environmental changes affecting the sensors 122. The pattern selection engine 108 can select a particular illumination pattern when a threshold amount of wind, ambient light, motion, and/or any other variable is detected. For instance, a static illumination pattern can be selected by the pattern selection engine 108 when an amount of motion detected by the sensor 122 is outside of a motion threshold, and select a dynamic illumination pattern when the amount of motion detected by the sensor 122 is within the motion threshold. In some embodiments, the pattern selection engine 108 can select a first dynamic illumination pattern, which can imitate a flame in the wind, when an amount of wind detected by a sensor 122 is within a wind threshold. Furthermore, the pattern selection engine 108 can select a second dynamic pattern, which can imitate a flame that is not being obstructed by wind, when the amount of wind detected by the sensor 122 is outside of the wind threshold.

The types of illumination patterns 112 can range in brightness, movement, color, and/or any other metric that can be associated with light. For instance, each of the sets of LEDs (the first LEDs 116, second LEDs 118, . . . Nth LEDs 120, etc.) can be arranged to illuminate a light guide 114, and the light guide can be structured to provide particular patterns of illumination. In some embodiments, the light guides 114 can include one or more flexible substrates and the sets of LEDs can be organic light emitting diodes (OLEDs) disposed onto the substrates. The substrates can be shaped as curved surfaces or planar surfaces, and each substrate can correspond to one of the first LEDs 116, the second LEDs 118, the Nth LEDs 120, respectively. Furthermore, signals from the sensors 122 can cause each of the substrates to illuminate individually and/or in combinations according to an illumination pattern selected by the pattern selection engine 108.

In some implementations, the system 100 can include one or more light guides 114, which can be light pipes, edge illuminated substrates, flexible films, and/or any other material that can direct light. For instance, a light pipe can be an etched column that outputs a pattern of light when at least one of the LEDs of the system 100 illuminates an end of the light pipe. The pipes can each include a circular cross-section, square cross-section, polygonal cross-section, and/or any other shape for a pipe cross-section. In other implementations, the light guides 114 can be edge illuminated substrates that are etched to provide different illuminated patterns when one or more of the LEDs are illuminating an edge of the edge illuminated substrates. The edge illuminated substrates can be disposed over each set of LEDs, and each edge illuminated substrate when a corresponding set of LEDs is illuminated.

In some implementations, a section of a light guide 114 can be illuminated by an individual LED or set of LEDs, according to the illumination pattern selected by the pattern selection engine 108. For instance, a light guide 114 can include multiple light pipes or multiple substrate layers that can be completely illuminated in a static, high output mode in response to motion being detected by a sensor 122. After a predetermined amount of time has passed since the motion was last detected, less than the total number of light pipes or substrate layers can be illuminated in a dynamic, medium output mode. The static, high output mode can correspond to a white light output, and the dynamic, medium output mode can correspond to a multicolored output (e.g., at least orange and blue light to imitate a flame). Furthermore, when another predetermined amount of time has passed, less light pipes or substrate layers can be illuminated in a dynamic, low-medium output mode. Eventually, the system 100 can operate to illuminate one or more light pipes or substrate layers (e.g., a single substrate layer) in a dynamic or static, low output mode. The low output mode can provide one or more colors of light that can by dynamically or statically displayed until a separate illumination pattern is selected by the pattern selection engine 108. For instance, the low output mode can provide a single static color of static light from the first LEDs 116 until a threshold amount of sound, light, or motion is detected, wherein, in response, the single color of light can be displayed as a dynamic pattern.

In some implementations, the system 100 can include a pattern generation engine 106 that generates illumination patterns according to user inputs to the system 100, signals from the sensors 122, and/or any other input that can be provided to the computing device 104. The pattern generation engine 106 can generate illumination patterns corresponding to schedules set by a user of the system 100 via a user interface of the computing device 104. For instance, a user can set an on time and an off time for the LEDs, and, in response, the pattern generation engine 106 can compile multiple illumination patterns for use during the on time and the off time. An on time pattern can be a dynamic pattern that incorporates each light guide 114 and each set of LEDs, whereas an off time pattern can be a dynamic pattern that incorporates less than the total number of light guides 114 and less than the total number of LEDs. In this way, dynamic lighting patterns can be generated from basic inputs from the user.

In some implementations, sensor data 110 previously collected by the sensors 122 can be used by the pattern generation engine 106 to generated additional illumination patterns 112. For example, the sensor data 110 can be analyzed by the computing device 104 to identify and generate patterns corresponding to detected ambient light, sounds, user inputs, and/or any other data in order to provide a basis for generating an illumination pattern. In this way, when a subsequent pattern is detected in the incoming sensor data, the pattern selection engine 108 identify, from the illumination patterns 112 generated by the pattern veneration engine 106, a corresponding illumination pattern for the LEDs to employ. In some embodiments, a pattern can be identified in data associated with wind, sound, or weather, and a dynamic illumination pattern can be generated in response to the identified pattern. The dynamic illumination pattern can mimic the wind, sound, or weather, and/or provide a complementing pattern that becomes more or less dynamic when activity is identified in the wind, sound, ambient light, or weather.

In some implementations, the power source 102 can include multiple sources of energy, such as a gas power source and an electric power source. The gas power source can be used to fuel a gas flame, which can be provided when motion is detected at a sensor 122. When motion is no longer detected, the gas flame (e.g., a butane gas flame) can be put out or otherwise stopped, and the LEDs can be illuminated to provide a representation of the gas flame. In this way, the appearance of a gas flame can be provided by the system 100 when a user is away from the system 100, and a real flame can be provided by the system 100 when the user is near the system 100.

Figure 2:
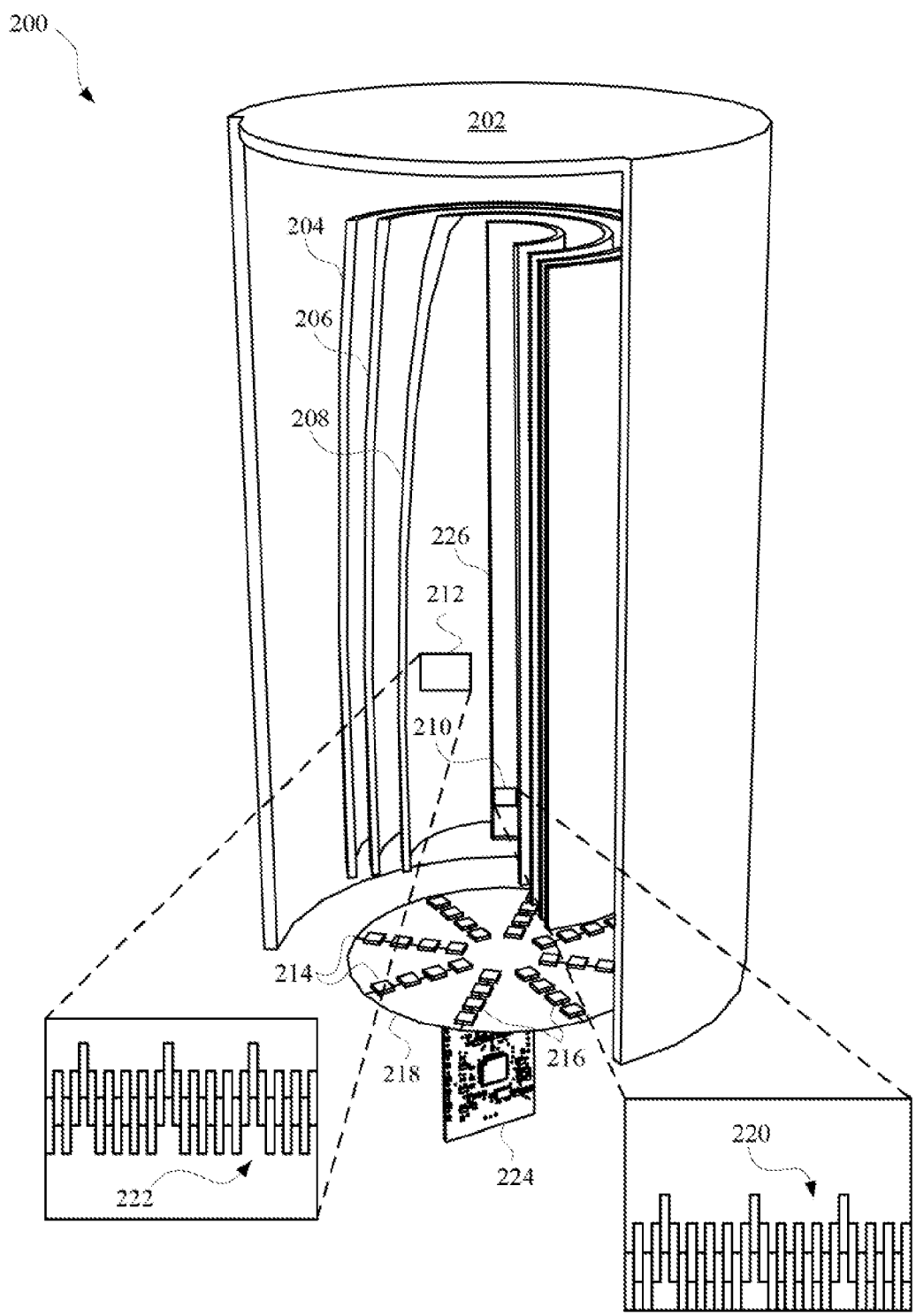
FIG. 2 illustrates a cut-away view of a lighting unit that can include multiple layers that can act as light guides to provide various static and/or dynamic illumination patterns.

FIG. 2 illustrates a cut-away view of a lighting unit 200 that can include multiple substrate layers that can act as light guides for providing creating various static and/or dynamic illumination patterns. The light guide substrate layers can be multiple different types of materials for producing patterns of light. For instance, in some implementations, the lighting unit 200 can include at least a first substrate 226, a second substrate 208, a third substrate 206, and a fourth substrate 204. Each of the light guide substrates can include a layer of printed LEDs, which can illuminate individually and/or in combination to provide various different color outputs and pattern outputs. In other implementations, each of the light guide substrates can include a flexible OLED layer that includes multiple OLEDs connected over an area of each substrate. The OLEDs can be controlled by a computing device 224, which can store multiple different static and/or dynamic illumination patterns that can be output by the flexible OLED layers. It should be noted that the substrates are illustrated as being displaced from the computing device 224 in order that more features of the lighting unit 200 can be viewed. In some implementations, the lighting unit 200 can include an array of LEDs (e.g., a first array of LEDs 214 and a second array of LEDs 216). However, in other implementations, where the substrates are flexible OLED layers, the elements on substrate 218 can be electrical contacts for transmitting data and/or power to the flexible OLED layers. Alternatively, the substrate 218 can be a mechanical support for providing a mountable surface on which the light guide substrates can be mounted.

In yet other implementations, the light guide substrates can be etched layers of transparent or semi-transparent material that will exhibit a particular lighting pattern when illuminated by the LEDs of the substrate 218. In other implementations, the light guide substrates can be light guide films that will illuminate in substantially uniform pattern when an edge the light guide films (e.g., an edge that is closest to the LEDs) is receiving light from a light source. The light guide films can be illuminated with different colored LEDs thereby causing them to illuminate with different colors.

In some implementations, each light guide substrate can have different surface arrangements in order to provide different illumination patterns that can be based on an output from a sensor connected to the computing device 224. For example, in some implementations the fourth substrate 204 can be a solid pattern that, when illuminated by the first array of LEDs 214, causes the fourth substrate 204 to illuminate with a solid, uniform color of light (e.g., a white or yellow light). Furthermore, each of the other light guide substrates can include etched patterns that can be illuminated by the LEDs of the substrate 218 to provide a patterned light output from the lighting unit 200. For instance, during operation of the lighting unit 200, the fourth substrate 204 can be exclusively illuminated in response to motion detected by a sensor that is connected to the computing device 224. When motion is no longer detected, or after a threshold period of no motion detected, the first substrate 226, second substrate 208, and third substrate 206 can illuminate according to an illumination pattern selected by a pattern selection engine (i.e., an application) operating at the computing device 224. The illumination pattern can, for example, mimic a flame using at least a first pattern 220 and/or a second pattern 222 provided at the first substrate 226 and the second substrate 208, respectively. It should be noted that sections of substrates are identified (e.g., a first section 212 and a section 210) to illustrate where substrates can be etched or otherwise include patterns. However, the patterns can be included at any location of any of the substrates. Furthermore, the number of substrates can be one or more depending on the application.

The lighting unit 200 can operate to output a flame-like illumination pattern that can change dynamically according to settings corresponding to the illumination pattern and/or signals provided by one or more sensors connected to the computing device 224. In some implementations, a flame-like illumination pattern can include a setting where the first substrate 226 is illuminated by blue LEDs, or a combination of LEDs that provide a blue light output. The blue light can illuminate the first pattern 220 and dynamically change intensity at different locations at the first substrate 226. In this way, a small blue light pattern will be output by the lighting unit 200, giving the impression that a blue flame is burning inside the lighting unit 200.

The flame-like illumination pattern can increase or decrease in intensity from the small blue light pattern according to a time schedule and/or changing environmental conditions of the lighting unit 200. For instance, the flame-like illumination pattern can increase in intensity when a motion sensor (e.g., a passive infrared sensor) detects motion near the lighting unit 200. In response to a first threshold amount of motion being detected, the second substrate 208 can be illuminated by a set of LEDs that are different than the set of LEDs illuminating the first substrate 226. For instance, the second substrate 208 can be illuminated with yellow or orange light, simultaneous to the first substrate 226 being illuminated with blue light. In this way, the second pattern 222 will receive the yellow or orange light, and provide a corresponding light pattern. As a result of the patterns being illuminated simultaneously, there will multiple layers of different colored light being output by the lighting unit 200, giving the effect of a medium-sized flame being the source of light.

Figure 3:
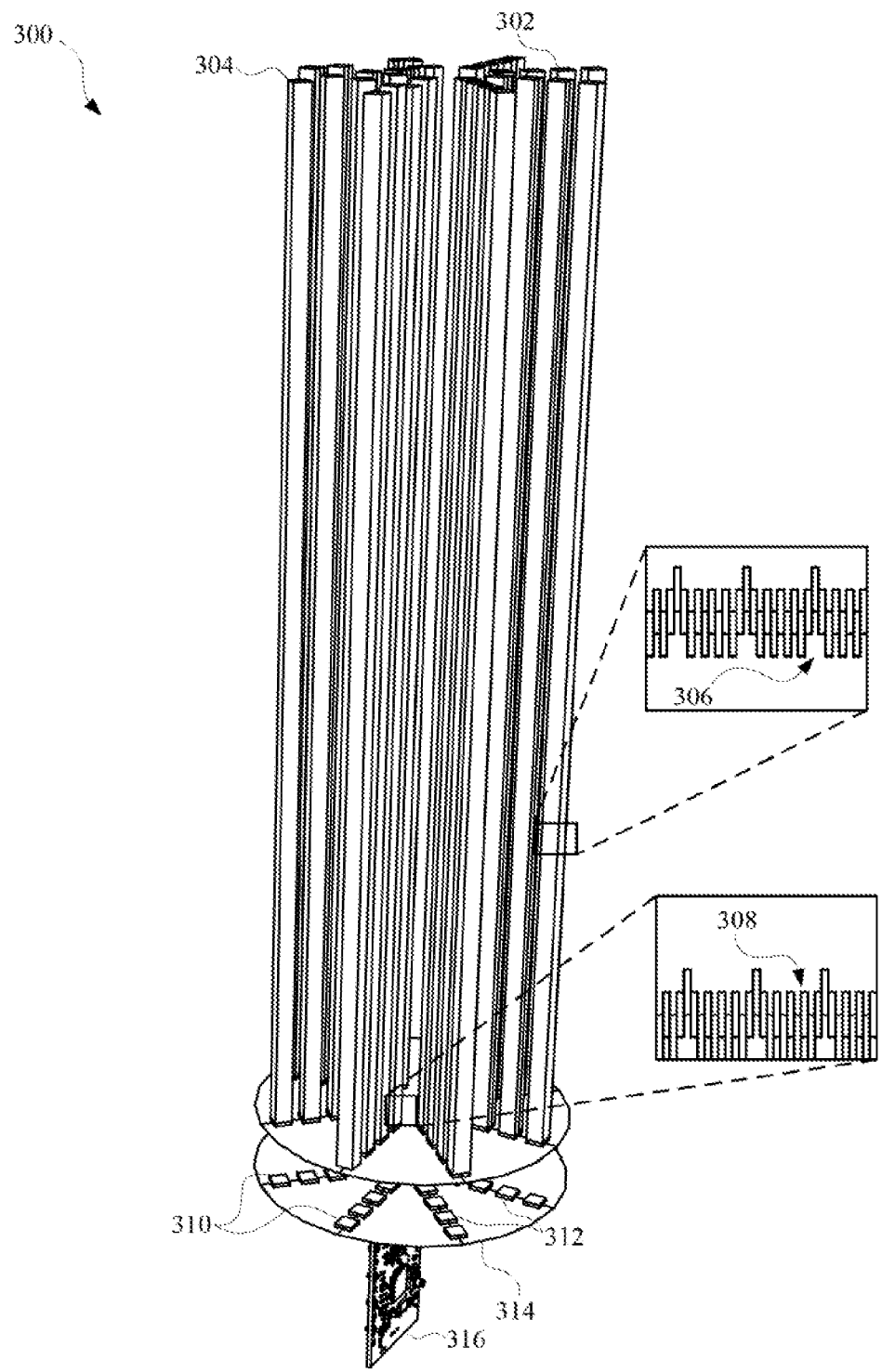
FIG. 3 illustrates a cut-away view of a lighting unit that can include one or more light guides.

FIG. 3 illustrates a perspective view of a lighting unit 300 that can include one or more light guides (e.g., art outer light guide 304 and an inner light guide 302). Each of the outer light guide 304 and the inner light guide 302 can extend away from a substrate 314 that includes multiple arrays of LEDs. The LEDs can provide different colors of light for illuminating the light guides. The LEDs can be controlled by a computing device 316, which can store instructions for causing the LEDs to illuminate according to dynamic and/or static illumination patterns. For instance, an inner LED array 312 can illuminate the inner light guide 302 with a dynamic blue lighting pattern in order to give the appearance of a blue flame burning at the lighting unit 300. The light emitted by the inner LED array 312 can be incident upon a first pattern 308 that is etched into the inner light guide 302 in order to create an illumination pattern when the inner light guide 302 is receiving light. Similarly, an outer LED array 310 can illuminate the outer light guide 304 with a dynamic or static lighting pattern depending on an operating mode of the computing device 316. For instance, the outer LED array 310 can be illuminated with a static lighting pattern from the outer LED array 310, and the light from the outer LED array 310 can be incident upon the second pattern 306. The second pattern 306 can be etched into the outer light guide 304 in order to create an illumination pattern when the outer light guide 304 is receiving light. However, in some implementations the outer light guide 304 can provide a uniform illumination pattern when receiving light from the outer LED array 310.

In some implementations, the first pattern 308 and/or the second pattern 306 can include etched areas with straight boundary lines, and in other implementations the first pattern 308 and/or the second pattern 306 can include etched areas with curved boundary lines. For instance, in some implementations the first pattern 308 can include crescent-shaped etchings in order to resemble a flame when illuminated. In other implementations, the first pattern 308 and/or the second pattern 306 can include square, circular, oval, polygonal, or any other shaped etch patterns in order to cause particular illumination patterns to be exhibited at the lighting unit 300.

In some implementations, the computing device 316 can include or be connected to one or more sensors that are responsive to operating conditions of the computing device 316 and/or environmental conditions of the lighting unit 300. Signals from the sensors can be used by lighting unit 300 as a basis for modifying an appearance of a flame-like illumination pattern that can be output from the lighting unit 300. For instance, in some implementations, the computing device 316 can store multiple different thresholds to which the signals from the sensors can be compared. When a signal or data from a sensor is within a first threshold, the lighting unit 300 can provide a first pattern output from the lighting unit 300. In some implementations, the first pattern output can be a static blue light emitted by an inner most array of LEDs of the substrate 314. The inner most array of LEDs can illuminate one or more light guides that are furthest from the perimeter of the lighting unit 300.

When the signal or data from the sensor is within a second threshold, the lighting unit 300 can provide a second pattern output from the lighting unit 300. In some implementations, the second pattern output can be a static blue and a static or dynamic orange (or yellow) light illuminated by the inner most array of LEDs and an array of LEDs adjacent to the inner most array of LEDs. The adjacent array of LEDs can be illuminated with the static or dynamic orange (or yellow) light, which can be brighter than the static blue light illuminating the inner most light guides. In this way, the orange or yellow light will extend above the static blue light because more of the adjacent light guides will be illuminated compared to the inner most light guides. This illumination pattern can resemble a flame that includes orange and blue light.

When the signal or data from the sensor is within a third threshold, the lighting unit 300 can provide a third pattern output from the lighting unit 300. In some implementations, the third pattern output can include static and/or dynamic blue light, orange light, and/or yellow light. For instance, a first array of LEDs can provide a static or dynamic blue light that illuminates a first set of light guides. A second array of LEDs can provide a static or dynamic orange or yellow light that illuminates a second set of light guides that surround the first set of light guides. The second array of LEDs can provide an amount of light that illuminates a portion of the second set of light guides that is above the blue light emitted by the first array of LEDs. Furthermore, a third array of LEDs can provide a static or dynamic orange or yellow light that illuminates a third set of light guides. The third set of light guides can surround both the first set of light guides and the second set of light guides. Additionally, the third array of LEDs can provide an amount of light that illuminates a portion of the third set of light guides that is above the blue light emitted by the first array of LEDs and the orange or yellow light emitted by the second array of LEDs. In this way, the light emitted by the lighting unit 300 when the signal or data from the sensor reaches the third threshold will be brighter than the light emitted by the lighting unit 300 when the signal or data from the sensor reaches the second threshold.

This change in size and illumination of a flame-like illumination pattern from the lighting unit 300 can resemble a flame that is changing in size. When the sensor is a motion sensor or ambient light sensor, the flame-like illumination pattern can increase or decrease in size in response motion-related or ambient light related data being provided by the sensor. For instance, as an amount of ambient light reaches the first threshold, the second threshold, and the third threshold, the flame-like illumination pattern can increase in size by illuminating more light guides in order to resemble a flame that is growing in volume.

Figure 4:
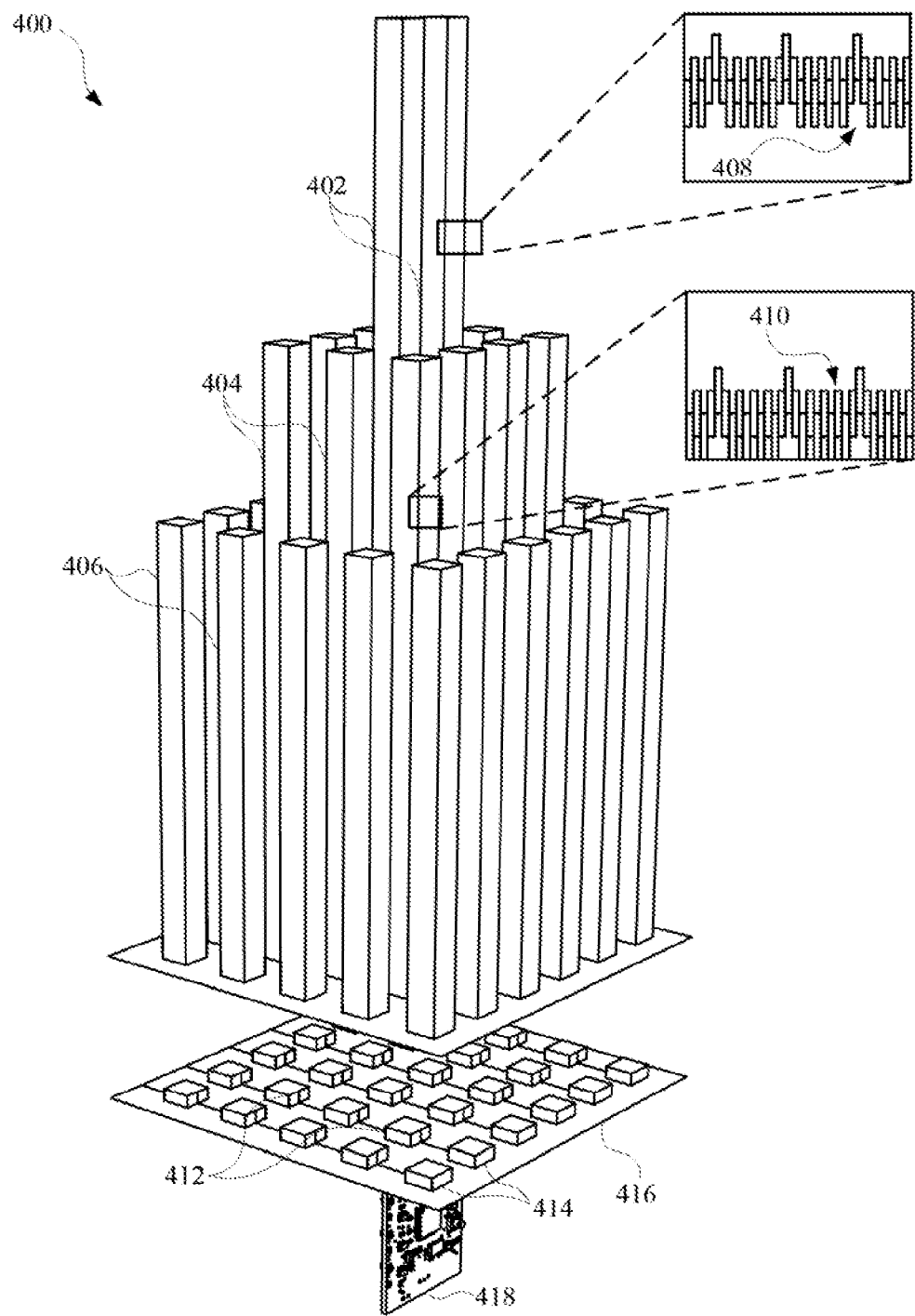
FIG. 4 illustrates a perspective view of a lighting unit that includes light guides of different dimensions.

FIG. 4 illustrates a perspective view of a lighting unit 400 that includes light guides of different dimensions. The lighting unit 400 can include a first set of light guides 402 that extend from an inner most portion of the lighting unit 400, a third set of light guides 406 that extend from an outer most portion of the lighting unit 400, and a second set of light guides 404 disposed between the first set of light guides 402 and the third set of light guides 406. The difference in dimensions of the light guides can provide unique illumination patterns when the light guides are illuminated by static and/or dynamic lighting patterns. In some implementations, the light guides can be flexible light guides. In other implementations, each light guide can be a hollow shape that has a cross-sectional shape such as a circle, square, oval, polygon, and/or any other shape suitable for a lighting guide configuration.

The lighting unit 400 can operate according to any of the implementations discussed herein. For instance, a computing device 418 of the lighting unit 400 can include or be connected to sensors that provide data associated with environmental conditions and/or operating conditions of the lighting unit 400. The sensors can provide data related to motion, ambient light, battery charge, power consumption, temperature, and/or any other feature that can affect an operation of a lighting unit 400. Data from the sensors can be used to modify an output of the lighting unit 400. For instance, a size of a flame-like illumination pattern emitted by the lighting unit 400 can change according to the data from the sensor(s). The flame-like illumination pattern can include mostly blue light when the data includes values that have reached a first threshold, and the flame-like illumination pattern can include mostly non-blue light when the data includes values that have reached a second threshold.

The flame-like illumination pattern can be a dynamic or static pattern that includes light provided by at least a first array of LEDs 412 and a second array of LEDs 414 that are disposed over a substrate 416. Light from the LEDs can be incident upon patterns that are etched into the light guides. For instance, the first set of light guides 402 can include a first pattern 408 and the second set of light guides 404 can include a second pattern 410. Each of the first pattern 408 and the second pattern 410 can be the same or different, depending on the desired illumination pattern.

In some implementations, the third set of light guides 406 can be exclusively illuminated by the second array of LEDs 414 in response to particular sensor data from a sensor connected to the computing device 418. For instance, when motion is detected by a motion sensor, the lighting unit 400 can cease providing a flame-like illumination pattern and, instead, provide a static lighting pattern, which can be brighter than the flame-like illumination pattern. After a threshold amount of time has passed since the latest motion was detected, the flame-like illumination pattern can continue to be provided by the lighting unit 400. In some implementations, an ambient light sensor can indicate that an amount of ambient light has fallen to a particular threshold and, in response, the computing device 418 can cause the flame-like illumination pattern to be emitted by the lighting unit 400. When the ambient light is within the particular threshold and motion is detected by the motion sensor, the flame-like illumination pattern can be interrupted in order to provide a brighter, static illumination pattern. This can be useful in areas where people may be walking, thereby allowing the brighter, static light to guide the people walking. Alternatively, when the ambient light is within the particular threshold and motion is detected by the motion sensor, the flame-like illumination pattern can provide a higher lumen output and/or increase in size (e.g., by illuminating more light guides). This allows the flame-like illumination pattern to be more useful, as opposed to being an aesthetic feature of a location.

Figure 5:
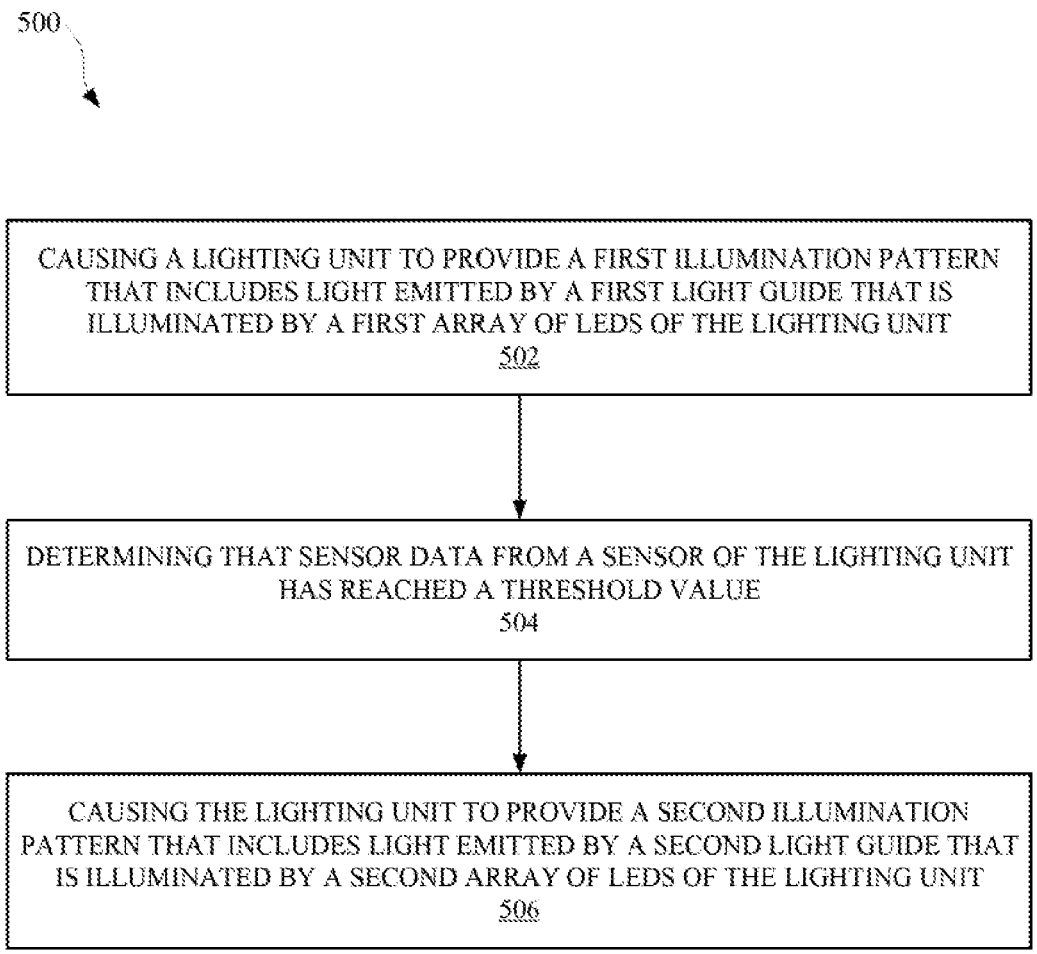
FIG. 5 illustrates a method for operating a lighting unit hat includes multiple light guides for providing static and dynamic illumination patterns.

FIG. 5 illustrates a method 500 for operating a lighting unit that includes multiple light guides for providing static and dynamic illumination patterns. The method 500 can be performed by a computing device and/or any other apparatus capable of controlling lights. The method 500 can include a block 502 of causing a lighting unit to provide a first illumination pattern that includes light emitted by a first light guide. The first light guide can be illuminated by a first array of LEDs of the lighting unit. In some implementations, the first light guide can include one or more disks, pipes, cylinders, blocks, films, and/or any other material that can direct light. For instance, the first light guide can be a stack of disks that are illuminated by the first array of LEDs, which can be disposed over a printed circuit board or other substrate. The first illumination pattern can be a static or a dynamic illumination pattern. For instance, the first illumination pattern can be a dynamic illumination pattern that causes the first light guide to illuminate with a flame-like illumination pattern. The flame-like illumination pattern can include a blue light that gradually changes form or shape in order to mimic a small, gas flame.

The method 500 can further include a block 504 of determining that sensor data from one or more sensors of the lighting unit has reached one or more thresholds. The sensor data can correspond to motion data, ambient light data, power data, temperature data, frequency data, and/or any other data that can be associated with an operation of a lighting device. For instance, the sensor data can be indicative of an amount of motion or ambient light falling to the threshold value. The light unit can use the sensor data to determine a lighting pattern to provide at the lighting unit. When an increase in motion is detected, the lighting unit can respond by providing a static illumination pattern, in order to illuminate a path of a person walking by the lighting unit. As the amount of detected motion decreases, the lighting unit can provide a dynamic illumination pattern, which can mimic a flame. In this way, the lighting unit will not be a distraction or strain a person's eyes, should the lighting unit be providing light for an extended period of time. As the amount of motion decreases or increases, and/or an amount of detected ambient light decreases, the dynamic illumination pattern can increase in brightness (e.g., the flame mimicked by the lighting unit can become brighter). This allows the lighting unit to be responsive to environmental conditions, without providing less artificial elements to the environment.

The method 500 can also include a block 506 of causing the lighting unit to provide a second illumination pattern that includes light emitted by a second light guide. The second light guide can be illuminated by a second array of LEDs of the lighting unit. The second illumination pattern can be a dynamic illumination pattern similar to the first illumination pattern, except the second illumination pattern can be brighter and/or more dynamic than the first illumination pattern. For instance, the first illumination pattern can be a flame-like illumination pattern and the second illumination pattern can represent a brighter flame than the first illumination pattern. In order to exhibit a brighter flame, the second array of LEDs can illuminate the second light guide more than the first array of LEDs is illuminating the first light guide. Furthermore, the second illumination pattern can include brighter colors (e.g., yellow and/or white), whereas the first illumination pattern can include less bright colors (e.g., blue). In some implementations, the first illumination pattern can be output by the lighting unit simultaneous to the second illumination pattern being output by the lighting unit. In other implementations, the first illumination pattern can be a dynamic illumination pattern and the second illumination pattern can be a static illumination pattern, as discussed herein.

Figure 6:
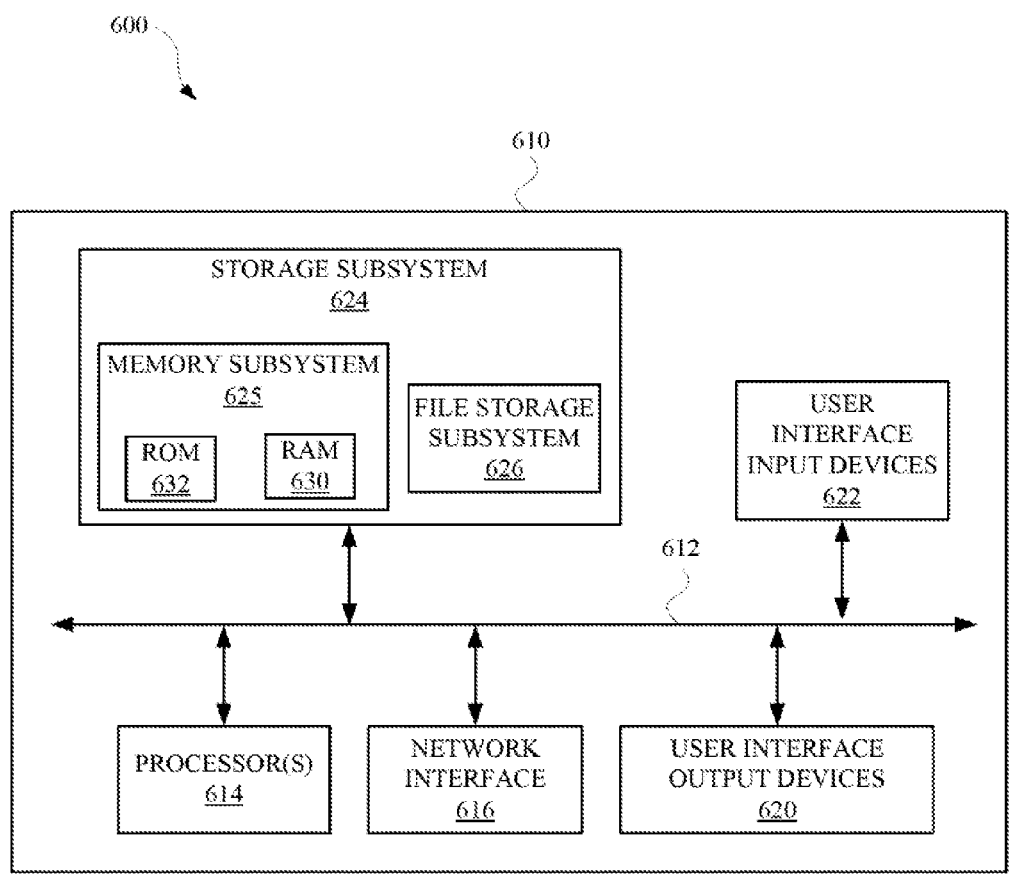
FIG. 6 is a block diagram of an example computer system.

FIG. 6 is a block diagram of an example computer system 610 (i.e., computing device). Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more of the computing device 104, computing, device 224, computing device 316, computing device 418, lighting unit 200, lighting unit 300, lighting unit 400, pattern generation engine 106, pattern selection engine 108, and/or any other element discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing, embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related, or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements) etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean "including but not limited to". Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A method implemented by one or more processors, the method comprising:
   causing a lighting unit to provide a first illumination pattern, wherein the first illumination pattern includes light emitted by a first light guide that is illuminated by a first array of light emitting diodes (LEDs) of the lighting unit;
   determining that sensor data from a sensor of the lighting unit has reached a threshold value, wherein the sensor is responsive to environmental conditions of the lighting unit; and
   causing the lighting unit to provide a second illumination pattern,
      wherein the second illumination pattern includes light emitted by a second light guide that is illuminated by a second array of LEDs of the lighting unit, and
      the first light guide and the second light guide are at least semi-transparent and extend, in parallel, away from the first array of LEDs and the second array of LEDs.

2. The method of claim 1, wherein the first illumination pattern is a dynamic illumination pattern and the second illumination pattern is a static illumination pattern.

3. The method of claim 2, wherein the sensor data corresponds to motion data from the sensor, and the first illumination pattern includes a color of light that is excluded from the second pattern.

4. The method of claim 1, wherein the second light guide includes multiple light guides that surround the first light guide.

5. The method of claim 1, wherein the first light guide and the second light guide include different etched patterns.

6. The method of claim 5, wherein the first light guide includes a first etched pattern that is located on a different area of the first light guide relative to a location of a second etched pattern included at the second light guide.

7. The method of claim 6, wherein the first etched pattern is located closer to the first array of LEDs and the second array of LEDs than the second etched pattern.

8. A lighting unit, comprising:
   a computing device;
   a sensor that is connected to the computing device and responsive to an environmental condition of the sensor;
   a first array of LEDs and a second array of LEDs, each controllable by the computing device; and
   a first light guide and a second light guide configured to distribute light emitted by the first array of LEDs and the second array of LEDs,
   wherein the computing device is configured to cause the first array of LEDs and the second array of LEDs to output a dynamic illumination pattern in response to a change in the environmental condition of the sensor, wherein the first light guide emits a different color of light than the second light guide when the dynamic illumination pattern is being output.

9. The lighting unit of claim 8, further comprising a substrate on which the first array of LEDs and the second array of LEDs are disposed, wherein the first light guide and the second light guide extend in a direction that is perpendicular to the substrate.

10. The lighting unit of claim 9, wherein the first light guide and the second light guide are at least semi-transparent and formed in a cylindrical shape.

11. The lighting unit of claim 9, wherein the first light guide and the second light guide include etched patterns, and a first etch pattern of the first light guide is closer to the substrate than a second etch pattern of the second light guide.

12. The lighting unit of claim 8, wherein the sensor is an ambient light sensor and the lighting unit further comprises a motion sensor, wherein the computing device is further configured to cause one of the first array of LEDs and the second array of LEDs to output a static illumination pattern in response to the motion sensor detecting a threshold amount of motion.

13. The lighting unit of claim 8, wherein the first light guide and the second light guide are of different lengths, and the second light guide is illuminated more than the first light guide when outputting the dynamic illumination pattern.

14. The lighting unit of claim 8, wherein the first light guide and the second light guide are disks that surround the first array of LEDs and the second array of LEDs, respectively.

15. The lighting unit of claim 8, wherein the first light guide and the second light guide are pipe-shaped guides that extend perpendicular from a substrate on which the first array of LEDs and the second array of LEDs are disposed.

16. A non-transitory computer readable medium configured to store instructions that, when executed by one or more processors, cause the one or more processors to perform steps that include:
  operating a first array of LEDs of a lighting unit according to a first dynamic illumination pattern that causes a first light guide of the lighting unit to receive incident light;
  receiving sensor data from a sensor connected to the lighting unit, the sensor configured to be responsive to environmental conditions of the lighting unit;
  operating, in response to receiving the sensor data, the first array of LEDs and the second array of LEDs according to a second dynamic illumination pattern that causes (i) a second light guide of the lighting unit to receive more incident light than the first light guide and (ii) the first array of LEDs to output a different color of light than the second array of LEDs.

17. The non-transitory computer readable medium of claim 16, wherein the sensor is an ambient light sensor and the sensor data is associated with a decrease in ambient light in an environment of the lighting unit.

18. The non-transitory computer readable medium of claim 16, wherein the second dynamic illumination pattern causes the first array of LEDs to change brightness more dynamically than the first dynamic illumination pattern.

19. The non-transitory computer readable medium of claim 16, wherein the steps further include:
  receiving additional sensor data corresponding to an increase in detected motion at the lighting unit; and
  in response to receiving the additional sensor data, operating a third array of LEDs according to a static illumination pattern that causes a third light guide of the lighting unit to be illuminated.

20. The non-transitory computer readable medium of claim 19, wherein the static illumination pattern further causes the third light guide to receive light that is brighter than the incident light associated with the second dynamic illumination pattern.

* * * * *